United States Patent [19]
Gee et al.

[11] 3,961,215
[45] June 1, 1976

[54] ROTOR FOR WHEEL SPEED SENSOR ASSEMBLY

[75] Inventors: Thomas A. Gee, Allen Park; Gerald L. Jacobs, Southfield; Gunnar Baltare, Livonia, all of Mich.

[73] Assignee: Eaton Corporation, Cleveland, Ohio

[22] Filed: Feb. 3, 1975

[21] Appl. No.: 546,375

Related U.S. Application Data

[63] Continuation of Ser. No. 427,562, Dec. 26, 1973.

[52] U.S. Cl. ............................................. 310/168
[51] Int. Cl.² ........................................ H02K 19/20
[58] Field of Search ............ 310/153, 168, 169, 91, 310/170, 90, 75, 75 C, 77, 79, 268, 42; 188/181, 181 A; 303/20, 21 SF

[56] References Cited
UNITED STATES PATENTS

| | | | |
|---|---|---|---|
| 2,221,814 | 11/1940 | Reid | 310/170 |
| 3,482,129 | 12/1969 | Riordan | 310/75 |
| 3,489,935 | 1/1970 | Hayes | 310/75 |
| 3,541,369 | 11/1970 | Murakami | 310/168 |
| 3,626,227 | 12/1971 | Ritsema | 310/168 |
| 3,626,228 | 12/1971 | Jordan | 310/168 |
| 3,772,550 | 11/1973 | Anselmino | 310/168 |
| 3,800,188 | 3/1974 | Wilke | 310/168 |
| 3,801,845 | 4/1975 | Gavitt | 310/168 |

*Primary Examiner*—R. Skudy
*Attorney, Agent, or Firm*—Teagno & Toddy

[57] ABSTRACT

A rotor is provided for use in a wheel speed sensor assembly for sensing angular velocity of a wheel about a wheel support. The rotor is adapted to be mounted to a wheel for rotation therewith about an axis of rotation. The rotor includes a wall portion which extends in an axial direction coaxially about the axis of rotation and terminates in an annular edge portion. The rotor face has ripples or undulations formed therein which define an annular array of lands and recesses for providing wheel speed information to a sensor during wheel rotation. Also, the undulations provide a rotor face structure exhibiting a high degree of stiffness to resist deflection by forces applied to the rotor face. The wall portion also serves as an oil slinger to route oil or grease derived from a wheel hub or the like away from proximately located brake shoes. The rotor may be mounted to a wheel, such as to the brake drum mounting flange, by means of an annular flange which extends radially outward from the wall portion.

3 Claims, 6 Drawing Figures

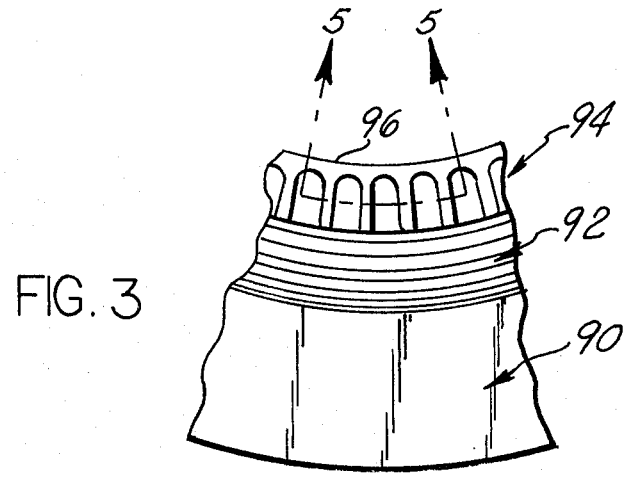
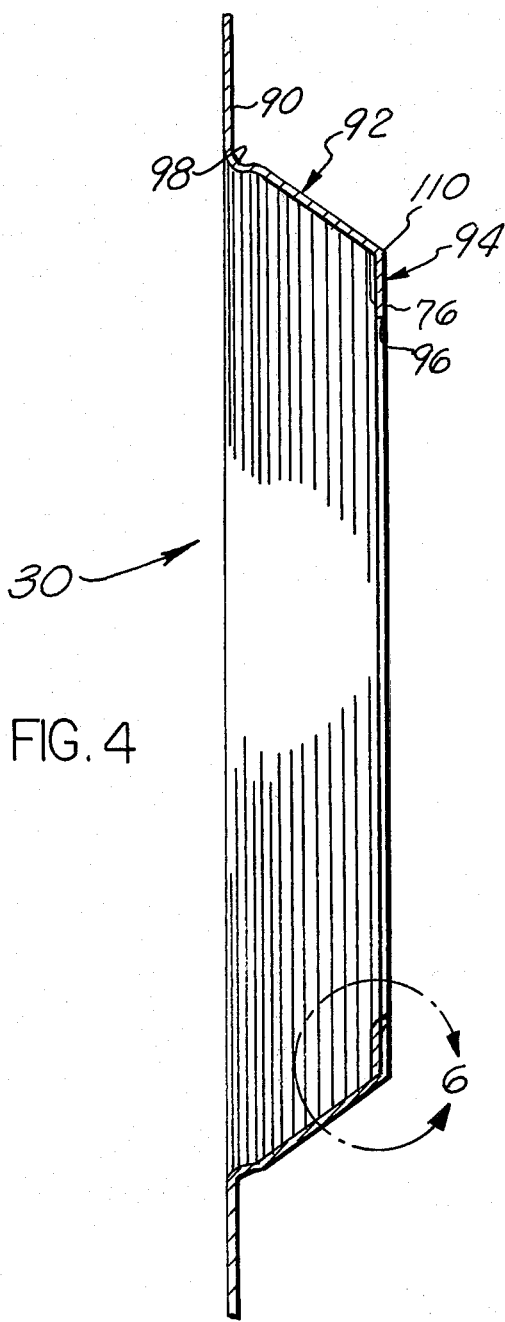
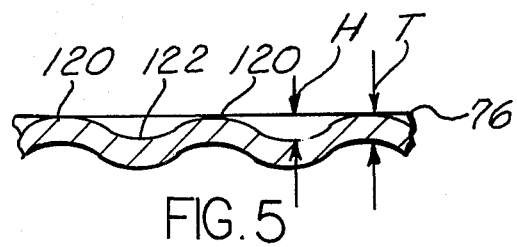
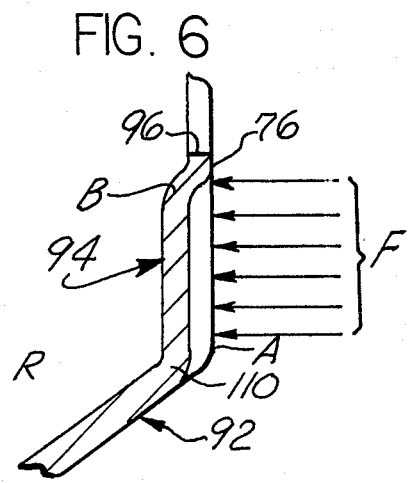

ROTOR FOR WHEEL SPEED SENSOR ASSEMBLY

This is a continuation of application Ser. No. 427,562, filed Dec. 26, 1973.

This invention relates to the art of wheel speed sensor assemblies for sensing the angular velocity of a vehicle wheel and, more particularly, to an improved rotor for use in such a sensor assembly.

The invention is particularly applicable for use as a rotor exciter in a variable reluctance sensor assembly employing an electromagnetic stator pick-up and will be described with particular reference thereto; although, it is to be appreciated that the rotor may be employed with a stator pick-up which senses rotor velocity by other than electromagnetic means, such as by detecting rotor undulation height variations through metal detecting circuitry or by radar or by direct mechanical contact.

One specific application of a wheel speed sensor assembly is in an anti-skid system for automotive and truck vehicles. In systems for truck vehicles, the sensor assembly may be associated with a truck wheel-axle assembly. The rotor is mounted to the wheel for rotation therewith about the axle housing. The wheel speed pick-up or stator is mounted so as to be in close proximity to the rotor and, for example, may be mounted to a brake mounting flange which extends radially from the axle housing. The sensor assembly may employ an electromagnetic sensor wherein the rotor is a ferromagnetic toothed rotor and the stator includes a source of magnetic flux, either an electromagnet or a permanent magnet, with the magnetic circuit including an air gap between the stator and the rotor, which provides a variable reluctance path during rotor rotation.

It is known to provide a self gaging means for purposes of automatically establishing a predetermined magnetic air gap between the stator and rotor. This is accomplished with the use of gage members which are mounted in association with a slidably affixed stator pick-up assembly. The gage members extend across the air gap and bear against the facing surface of the rotor. As will be later described, the rotor is a load bearing member and must be constructed such that it will withstand the forces exerted thereon by the gage members, while at the same time, providing recesses or teeth or the like to define a variable reluctance path during wheel rotation.

It is desirable, in the interest of economy, to provide a relatively lightweight rotor which may be inexpensively constructed, as by stamping or drawing sheet metal. However, if such a rotor is employed in a sensor assembly having such gage members, then the rotor is a load bearing member and must exhibit sufficient rigidity to resist deflection by the forces exerted thereon by the gage members. It is also desirable in a wheel-axle assembly to provide an oil slinger to route oil or grease away from the brake shoes.

It is therefore an object of the present invention to provide a rotor for a wheel speed sensor assembly wherein the rotor may be constructed of relatively thin sheet metal in such a manner to exhibit sufficient rigidity to resist deflection by forces exerted thereon, as from gage members.

It is a still further object of the present invention to provide a rotor, for a wheel speed sensor assembly, which is adapted to be mounted to a vehicle wheel and constructed in such a manner to route oil or grease away from proximately located brake shoes.

It is a still further object of the present invention to provide a combined one piece rotor and oil slinger constructed of relatively thin material, such as sheet metal, and adapted to be mounted on a vehicle wheel so as to route oil or grease away from brake shoes, located proximate thereto, while at the same time providing a radially extending information surface having undulations therein which provide wheel speed information during wheel rotation and which provide sufficient rigidity to resist deflection by forces exerted thereon, as from gage members.

In accordance with the broader aspects of the invention, the rotor includes a wall portion and a rotor face portion. The wall portion extends coaxially about the rotor axis of rotation from a first annular edge portion to a second annular edge portion. The rotor face portion extends at an angle from the second annular edge portion and terminates in a peripheral edge which coaxially surrounds the rotor axis and is axially displaced from the first annular edge portion. The rotor face portion has undulations formed therein to define an annular array of equally spaced-apart lands, with adjacent lands being spaced from each other by a recess. Each of these lands and recesses extends for at least substantially the entire distance between the second annular edge portion to the peripheral edge.

In accordance with a more limited aspect of the invention, the wall portion extends in an axial direction coaxially about the rotor axis, and the rotor face portion extends radially inward from the second annular edge portion of the wall portion.

The foregoing and other objects and advantages of the invention will become more readily apparent from the following description of the preferred embodiment of the invention as taken in conjunction with the accompanying drawings, which are a part hereof, and wherein:

FIG. 3 is an enlarged fragmentary elevational view illustrating the construction of the preferred embodiment of the rotor of the present invention;

FIG. 4 is a sectional view taken along line 4—4, looking in the direction of the arrows in FIG. 3;

FIG. 5 is an enlarged sectional view taken generally along line 5—5, looking in the direction of the arrows in FIG. 3; and FIG. 6 is an enlarged fragmentary view illustrating a portion of the section indicated by the circle 6 in FIG. 4.

Reference is now made to the drawings wherein the showings are for purposes of illustrating a preferred embodiment of the invention only and not for purposes of limiting same. The sensor assembly is illustrated in FIGS. 1 and 2 as being incorporated in a wheel-axle assembly; however, it is to be understood that various features of the invention may be used in other applications wherein a sensor assembly is employed for sensing the rotational velocity of a rotating body, such as a vehicle wheel.

Figure 1:
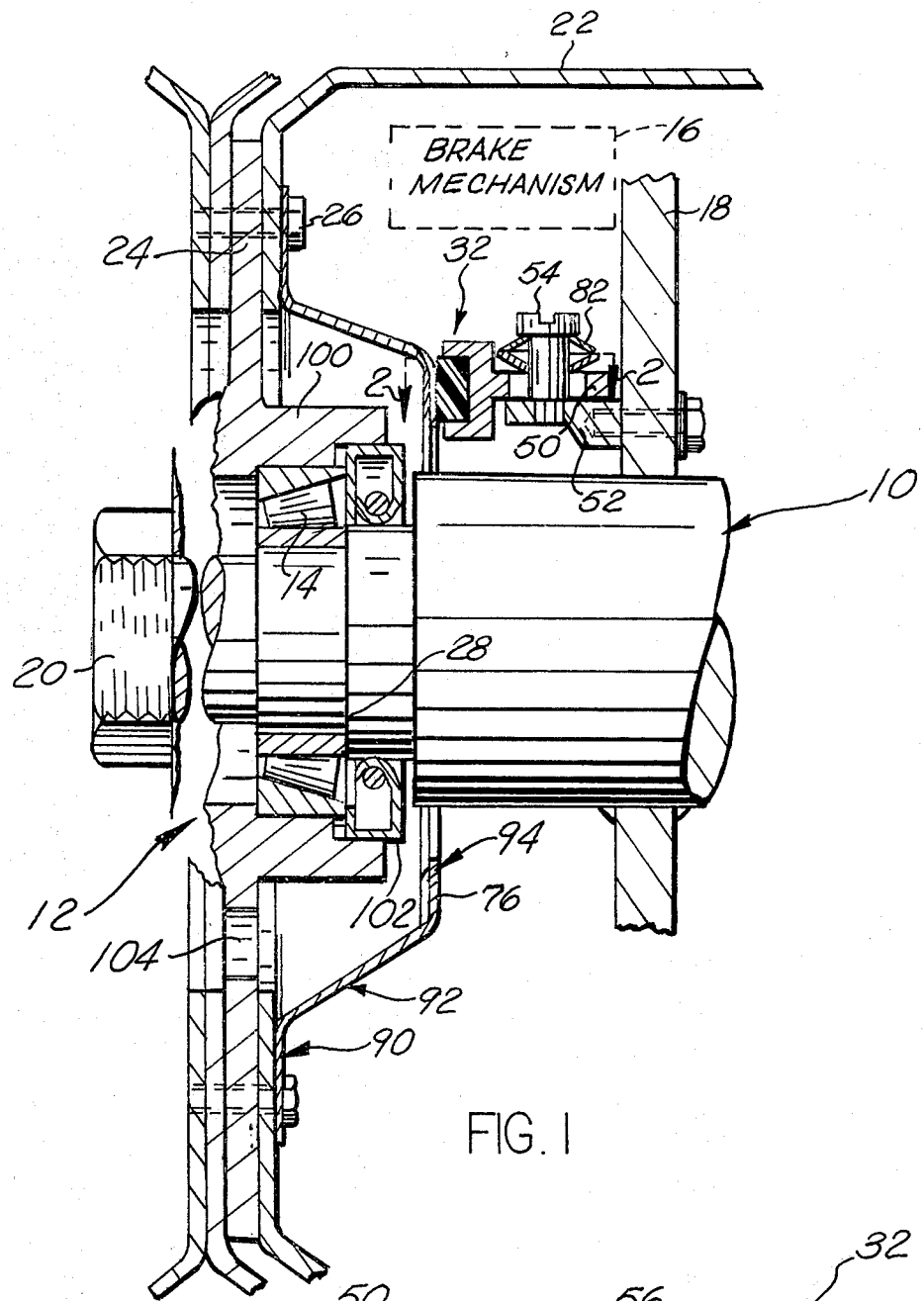
FIG. 1 is a longitudinal sectional view through a wheelaxial assembly and illustrating the assembled relationship of a wheel speed sensor assembly having a rotor constructed in accordance with the present invention.

The wheel-axle assembly illustrated in FIG. 1 includes a non-rotatable axle 10 on which a wheel 12 is rotatably supported by radial thrust bearings 14. A suitable brake mechanism 16, schematically illustrated in FIG. 1, may be supported on a brake mounting flange 18 carried by axle 10. The brake mechanism operates in a conventional manner to cooperate with a brake drum 22 which is, in turn, conventionally mounted on the wheel brake drum mounting flange 24, as with a suitable bolt 26.

In accordance with the invention, it is contemplated that the wheel speed sensor assembly may be mounted for cooperation with the wheel-axle assembly to provide output information representative of wheel velocity. The sensor assembly includes a rotor 30 mounted on wheel 12 for rotation therewith and a stator 32 mounted to the brake flange 18. The rotor 30 will be described in greater detail hereinafter with reference to FIGS. 3–6. It is contemplated that rotor 30 will be employed in conjunction with a stator that includes a self gaging pick-up assembly. Such a gaging assembly includes a mechanism for assuring that a predetermined magnetic gap distance is established between the rotor and the pole faces of an electromagnetic pick-up.

Figure 2:
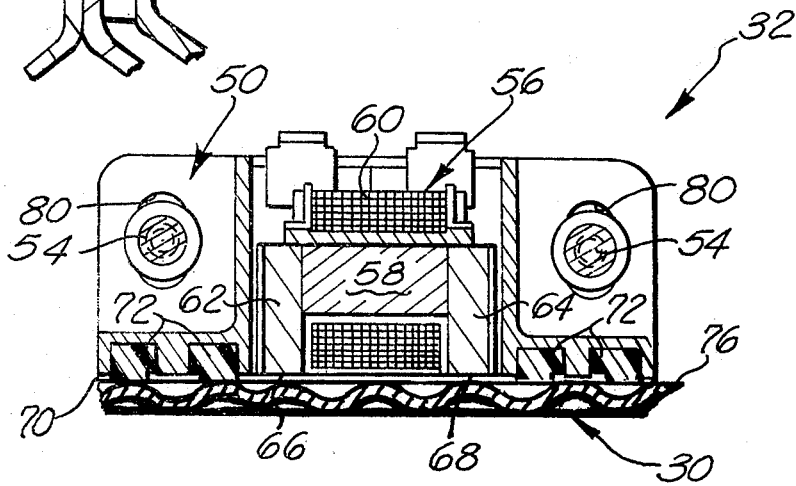
FIG. 2 is a sectional view taken along 2—2 looking in the direction of the arrows in FIG. 1.

Referring specifically to FIGS. 1 and 2, stator 32 includes a housing 50 which is mounted to a bracket 52 by means of suitable bolts 54 with the bracket 52 being suitably secured to the brake flange 18. Housing 50 carries an electromagnetic pick-up assembly 56 which, for example, may comprise a permanent magnet 58 surrounded by a coil 60 and a pair of ferromagnetic poles 62 and 64 and having respective pole faces 66 and 68. These pole faces are relatively flat and face the rotor 30 and are axially spaced therefrom by an air gap 70.

Housing 50 also carries plastic gage members 72 mounted in suitable recesses provided in the housing. Each gage member 72 bears against, and is in frictional sliding engagement with, the axially facing surface 76 of rotor 30. These gage members establish the selected air gap 70 since each projects axially by a known distance beyond the axially facing end of housing 50 toward the surface 76 of rotor 30.

Housing 50 is mounted on bracket 52 in such a manner to permit limited axial movement of the housing relative to flange 18 when axial forces of sufficient magnitude are applied. More specifically, housing 50 is provided with oversized axially extending slots 80 which receive bolts 54 to permit limited axial movement of housing 50 relative to bracket 52. The housing is frictionally held in place to resist axial movement relative to bracket 52 by means of spring washers 82, each being interposed between the head of a bolt 54 and housing 50. During assembly, the bolts 54 are tightened against the resilient force exerted by springs 82 sufficiently that housing 50 is frictionally held in place.

During initial assembly, housing 50, with gage members 72 installed in the face, is located on bracket 52 in the outermost slidable position and held in place by tightening the bolts 54. Once that positioning is attained, the wheel assembly, with rotor 30 pre-positioned in the assembly, is installed in the conventional manner by tightening the axle nut 20 until the bearing 14 contacts shoulder 28 of axle 10. As the axle nut 20 is being tightened the rotor 30 bears against gage members 72 which in turn bear against housing 50 and push it back on its slidable mounting. Thus, the self-gaging assembly serves to establish a rotor face and sensor housing gap relationship determined by the gauge blocks and independent of the dimensional tolerances of the related parts. The force developed on the rotor during this process is equal to the frictional force developed by the clamping force of spring washers 82.

The friction force is typically 150 pounds. The force is intentionally of a high magnitude to assure that the sensor will not be dislocated by vibrations and impacts subjected to the vehicle axle.

With a magnetic reluctance pick-up, as well as other types, a small air gap 70 is desirable to provide high signal output. Prevention of intercontact and subsequent damage of rotor face 76 and pole faces 66 and 68 is desirable. Thus, the air gap 70 is set at a value to prevent rotor axial runout and rotor elastic deflections, which result from the push back friction forces from eventually contacting and wearing the sensor face. To utilize the self-gaging feature described and to minimize the air gap and thereby maximize signal output, it is important that the rotor be constructed to exhibit strength and stiffness so that rotor surface 76 will minimize deflection and deformation by axial forces exerted by gage members 72.

Reference is now made to FIGS. 3, 4, 5, and 6 which illustrate the preferred construction of the rotor in accordance with the present invention. Rotor 30 is constructed of relatively thin ferromagnetic material, such as sheet steel having a thickness on the order of 0.06 inch. This permits a lightweight, stiff rotor structure having a high natural frequency and hence, a structure which contributes a low level of noise. The rotor is formed or shaped, as by stamping or by drawing, so that in cross section, as shown in FIG. 4, it resembles a hat having a brim, a continuous sidewall, and a top, but with a portion of the top being cut away to define a circular hole. More specifically, rotor 30 has an annular brim or mounting flange 90, a continuous sidewall 92 which extends axially away from flange 90 and radially inward therefrom and terminates in a radially inwardly extending rotor face 94. Rotor face 94 terminates in an inner peripheral edge 96 which, in assembly, coaxially surrounds and is is spaced from the axle 10. The brim or mounting flange 90 is formed with a reverse bend at the outer edge 98 of sidewall 92 so as to extend essentially radially outward. Mounting flange 90 is provided with suitable aperatures or the like to receive bolts 26 whereby it may be secured to the brake drum mounting flange 24.

As best shown in FIG. 1, the sidewall 92 is spaced radially outward from the hub 100 of wheel 12 and radially inward of the brake mechanism 16. The wall extends axially by a distance which is slightly beyond that of a conventional oil seal 102, mounted between axial housing 10 and hub 100. Consequently, oil and grease which may be spun off from the oil seal 102 will be caught by the radially inward facing surface of sidewall 92 and by the inner surface of rotor face 94 to thereby prevent the brake drum 22 and brake mechanism 16 from being contaminated by oil and grease. Preferably, wheel 12 is provided with an axially extending escape hole 104 through which trapped oil and grease may be vented.

The rotor face portion 94 is cantilevered from the edge portion 110 of sidewall 92 and is constructed of relatively thin sheet material. Consequently, there will be a tendency for the rotor face to be deflected by the axial forces F exerted by the gage members 72. If the forces cause the rotor face to deflect with a permanent set, the face runout would be increased. This, then, would cause the rotor face 76 to wear into the pole faces 66 and 68 and adversely detract from the signal levels obtained from the electromagnetic sensor. However, even elastic deflections in excess of the designed air gap 70 caused by forces F would result during rotor rotation in the same detraction. Consequently, it is desirable that the cantilevered rotor face 94 which is the greatest contributor to deflection, be constructed so as to exhibit relatively high stiffness (low elastic deflection) to resist deflection.

The rotor 94 also carries information for use in determining angular velocity of a rotating wheel. If the rotor face 94 be flat and the information be carried as slots or apertures, then the resulting thin walled rotor face structure would be deflected by axial forces F. It has been determined that the axial forces F produce an internal moment acting in the area of corner A, adjacent peripheral edge 110, which is the major contributing factor to the tendency of the rotor face 94 to deflect. Improved strength in the area of corner A is required to achieve low deflection rates. This is achieved with the ripple-faced rotor construction described below.

Rotor face 94 is stamped or formed so as to have ripples or undulations formed therein. These undulations define alternate lands 120 and recesses 122 in an annular array coaxially about the rotor axis of rotation. The undulations are formed such that each recess 122 extends radially inward from edge 110 to a point spaced from the inner peripheral edge 96 so that each recess extends for substantially the entire radial width of rotor face 94. The construction is such that there are preferably 60 lands 120 and 60 recesses 122 which are equally spaced in an annular array about the rotor axis. The thickness of the sheet metal employed is sufficient to provide magnetic flux carrying capability so that, for example, a magnetic circuit may be completed from the permanent magnet 58 through pole 64, across air gap 70, through the rotor face 94, then back across through the air gap 70, and through pole 62 to the permanent magnet 58. As the rotor is rotated about its axis of rotation, the undulations in the rotor face 94 will provide a variable reluctance path so as to provide a variable output signal taken from coil 60 in the form of a substantially sinusoidal voltage exhibiting a frequency proportional to angular velocity.

The magnitude of the induced voltage at sensing coil 60 is dependent upon the flux change that takes place at poles 62 and 64. The magnitude of the flux change is determined, assuming a constant axial gap 70, by the depth of each recess 122. The strength and stiffness of the sheet metal construction of rotor face 94 is determined by material thickness and material distribution. The height H of the undulations affects the flux change at poles 62 and 64. Consequently then, for a given spacing of lands 120, and a given stretching of the sheet metal, as by drawing, the height H of the undulations is determined by the thickness T of the material. In this embodiment of the invention, the material thickness T was determined by the amount of magnetic flux carrying capability required. With this thickness being set, the maximum undulation height H was obtained while, at the same time, optimizing the metal distribution to attain sufficient stiffness to resist deflection by axial forces F.

From FIGS. 5 and 6 then, it will be noted that the undulation height H is substantially on the order of the thickness T of the metal employed. The metal may be stretched sufficiently that height H may exceed thickness T by 50 percent or so. The area A of rotor face 94 is the location contributing the primary deflection and that a secondary area contributing to deflection is that of area B. To attain stiffness, the undulations were formed to provide substantial metal distribution at areas A and B. This is achieved by having the undulations extend from area B to area A and into the wall 92, as opposed to providing a ripple face which does not extend into the wall. Thus, the total metal thickness in an axial direction in area B is on the order of H + T. Stiffness at area B is achieved by constructing the rotor face such that the metal wall in each recess 122 extends upward (axially) in area B to surface 76 and then terminates in the inner peripheral edge 96. This upward (or axially) extending wall in area B has a total metal thickness on the order of H + T.

Whereas the rotor 30 is preferably employed in conjunction with a magnetic pick-up assembly is to be appreciated that angular velocity of the rotor, and hence of a vehicle wheel, can be sensed by other means. For example, passage of the lands 120 during rotor rotation may be detected as with a mechanical feeler, or by metal detecting apparatus, or by radar, or other methods.

Although the invention has been described in conjunction with a preferred embodiment, it is to be appreciated that various modifications may be made without departing from the spirit and scope of the invention as defined by the appended claims.

We claim:

1. A rotor for use in a wheel speed sensor for sensing angular rotation of a wheel support, said rotor having an axis of rotation and comprising a wall portion and a rotor face portion wherein said wall portion extends in an axial direction coaxially about said axis and said rotor face portion extends generally radially inward from said second edge portion, said wall portion further extending coaxially about said axis from a first annular edge portion to a second annular portion, said rotor face portion being cantilevered from said second edge portion and extending at an angle therefrom and terminating in a peripheral edge which coaxially surrounds said axis and which is axially spaced from said first annular edge portion, said rotor face portion having undulations formed therein defining an annular array of equally spaced apart lands wherein adjacent lands are spaced apart from each other by a recess, said undulations being formed such that said lands and recesses extend for at least substantially the entire distance from said second annular edge to said peripheral edge, said recesses and lands extend toward said peripheral edge and terminate short thereof to define relatively a smooth peripheral edge coaxial about said axis, said wall portion and said rotor face portion are integral and formed from material having a generally uniform thickness T, said recesses in said rotor face portion having a depth H, where H is on the order of T, the distance between said peripheral edge and said second edge portion is substantially greater than said material thickness T, and said wheel is provided with an axially extending escape hole for trapped oil and grease.

2. A rotor is set forth in claim 1 wherein said material is ferromagnetic sheet steel having a thickness of approximately 0.06 inches.

3. A rotor as set forth in claim 1, wherein said rotor is a one-piece assembly.

* * * * *